United States Patent [19]
Kako

[11] Patent Number: 5,563,515
[45] Date of Patent: Oct. 8, 1996

[54] CYLINDER IDENTIFYING APPARATUS FOR A MULTI-CYLINDER INTERNAL COMBUSTION ENGINE WITH MISFIRE DETECTION

[75] Inventor: Hajime Kako, Himeji, Japan

[73] Assignee: Mitsubishi Denki Kabushiki Kaisha, Tokyo, Japan

[21] Appl. No.: 24,491

[22] Filed: Mar. 1, 1993

[30] Foreign Application Priority Data

Mar. 2, 1992 [JP] Japan ..................... 4-044694

[51] Int. Cl.$^6$ ............... F02P 17/00; F02D 1/00; F02D 41/00; F02B 77/08
[52] U.S. Cl. ............... 324/391; 324/399; 73/117.3
[58] Field of Search ............... 324/391, 345, 324/399, 378, 379, 380; 73/116, 117.3

[56] References Cited

U.S. PATENT DOCUMENTS

| | | | |
|---|---|---|---|
| 4,547,734 | 10/1985 | Spaude | 324/399 |
| 4,928,228 | 5/1990 | Fujimoto et al. | 73/117.3 |
| 4,989,448 | 2/1991 | Fuhui et al. | 73/116 |
| 5,044,336 | 9/1991 | Fuhui | 73/116 |
| 5,196,844 | 3/1993 | Tomisawa et al. | 324/391 |

FOREIGN PATENT DOCUMENTS

| | | |
|---|---|---|
| 3922447 | 2/1990 | Germany . |
| 4031128 | 6/1991 | Germany . |
| 2102378 | 4/1990 | Japan . |
| 2104979 | 4/1990 | Japan . |

*Primary Examiner*—Walter E. Snow
*Attorney, Agent, or Firm*—Sughrue, Mion, Zinn, Macpeak & Seas

[57] ABSTRACT

A cylinder identified apparatus for a multi-cylinder internal combustion engine can prevent abnormal or erroneous engine control based on misidentification of cylinders due misfiring, thus avoiding possible damage to the engine. A signal generator 108 generates a reference position signal L in synchronization with the rotation of the engine, the reference position signal L comprising a series of a specific pulse corresponding to a specific cylinder and remaining pulses corresponding to the remaining cylinders. Each pulse of the reference pulse signal L has a rising edge and a falling edge respectively corresponding to a first reference position and a second reference position of a piston in a corresponding cylinder. The rising edge of each specific pulse is angularly coincident with that of each remaining pulse, whereas the falling edge of each specific pulse is angularly offset from that of each remaining pulse. A cylinder identifying element 111 identifies the cylinders based on the reference position signal L and generates a cylinder identification signal. A misfire sensing element (116, 118) senses misfiring in the engine for each engine cycle and generates a misfire determination signal. A cylinder identification evaluating element (112–115, 119) is responsive to the cylinder identification signal and the misfire determination signal for preventing the result of a cylinder identification, which has been performed by the cylinder identifying element during an engine cycle in which misfiring has been sensed by the misfiring sensing element, from being reflected on engine control.

5 Claims, 11 Drawing Sheets 5,563,515

CYLINDER IDENTIFYING APPARATUS FOR A MULTI-CYLINDER INTERNAL COMBUSTION ENGINE WITH MISFIRE DETECTION

BACKGROUND OF THE INVENTION

The present invention relates to a cylinder identifying apparatus for a multi-cylinder internal combustion engine which identifies cylinders of the engine (i.e., an operating state of each cylinder) based on a single kind of reference position signal indicative of predetermined reference positions or rotational positions of a piston in each cylinder. More particularly, the invention relates to such a cylinder identifying apparatus which is able to prevent misidentification of cylinders particularly during the occurrence of misfiring in the cylinders.

In general, in order to control various aspects of engine operations such as ignition timing, fuel injection timing, etc., for each cylinder of a multi-cylinder internal combustion, a reference position signal indicative of predetermined reference rotational positions of a piston in each cylinder is employed which is generated by a signal generator in synchronization with the rotation of the engine. To this end, the signal generator senses the rotation of a crankshaft of the engine or a camshaft operatively connected with the crankshaft for synchronized rotation therewith.

FIG. 7 shows a common signal generator in a perspective view, and FIG. 8 is a circuit diagram of the signal generator of FIG. 7. In FIG. 7, a rotation shaft 1 such as a crankshaft of an unillustrated internal combustion engine or a camshaft operatively connected therewith rotates in synchronization with the rotation of the engine. A rotary disk 2 is mounted on the rotation shaft 1 for integral rotation therewith, and has a plurality of windows or slits 3, 3a which are formed through the rotary disk 2 and disposed concentrically around the axis of rotation of the rotary disk 2. The total number of slits 3, 3a corresponds to that of cylinders, and in this example, it is four for a four-cylinder engine. The slits 3, 3a each extend in a circumferential direction of the rotary disk 2. Three slits 3 have the same circumferential length which is different from or smaller than that of a slit 3a which corresponds to a specific cylinder. Each slit 3 has a pair of radial edges representative of predetermined reference rotational positions or crank positions for a corresponding cylinder, and the slit 3a also has opposite radial edges representative of predetermined reference rotational positions or crank positions for the specific cylinder, which are different from those of the remaining cylinders. A light emitting diode 4 and a photo diode 5 are disposed on the opposite sides of the rotary disk 2 fin an axially aligned relation with respect to each other so that a beam of light emitted from the light emitting diode 4 passes through one of the slits 3, 3a in the rotary disk 2 during rotation thereof and is received by the opposed photo diode 5.

In FIG. 8, an amplifying circuit 6 amplifies an output signal from the photo diode 5 and generates an amplified output signal to a base of an output transistor 7 which has an emitter connected to ground and an open collector from which an output signal in the form of a reference position signal L is output.

FIG. 9 shows the waveform of the reference position signal L output from the signal generator shown in FIGS. 7 and 8. As can be seen from FIG. 9, the reference position signal L comprises a series of rectangular pulses of which a specific pulse corresponding to the specific slit 3a and hence to the specific cylinder has a pulse width greater than that of the remaining three pulses corresponding to the slits 3 and hence to the remaining cylinders. Each specific pulse of a larger pulse width corresponding to the specific cylinder has a rising or leading edge which occurs at a crank angle of 75 degrees before top dead center (hereinafter simply designated at B75") of the specific cylinder #2, a falling or trailing edge which occurs at a crank angle of 5 degrees after top dead center (hereinafter simply designated at A5"), and a pulse width or high-level period t1 corresponding to the circumferential length of the specific slit 3a in the rotary disk 2. Each of the remaining pulses of a smaller pulse width corresponding to the remaining cylinders has a rising or leading edge which occurs at a crank angle of B75° of a corresponding cylinder #1, #3 or #4, a falling or trailing edge which occurs at a crank angle of 5 degrees before top dead center of the corresponding cylinder (hereinafter simply designated at B5"), and a pulse width or a high-level period to corresponding to the circumferential length of a slit 3 for the corresponding cylinder. Thus, the falling edge of each specific pulse is displaced or offset by 10 degrees in the ignition-retarding direction. The period between the rising edges of successive pulses is designated at T.

When an operation of the engine such as ignition timing is controlled on the basis of the reference position signal L as shown in FIG. 9, an ignition timing is calculated by a timer from the first reference position B75" for each cylinder. Thus, in this case, no problem arises.

On the other hand, when the engine is cranking, ignition is carried out at the second reference position B5° for cylinders #1, #3 and #4, whereas the specific cylinder #2 is ignited at a timing or crank angle A5" which retards by an angle of 10 degrees from the second reference position B5" for the remaining cylinders, In this connection, failure in engine starting results from too early ignition, so there will be no problem even if the ignition timing for the specific cylinder is controlled in an ignition retarding direction based on the waveform of the reference position signal of FIG. 9.

FIG. 10 illustrates, in block form, a conventional cylinder identification apparatus for an internal combustion engine as disclosed in Japanese Patent Laid-Open No. 2-102378 or 2-104979. In this figure, the apparatus includes a signal generator 8 such as that of FIGS. 7 and 8, an interface 9 shaping the waveform of a reference position signal L generated by the signal generator 8, and a control unit in the form of a microcomputer 10 to which the reference position signal L from the signal generator 8 is input via the interface 9.

The microcomputer 10 includes a cylinder identification means in the form of a cylinder identification register 11 for receiving the reference position signal L from the signal generator 8 via the interface 9 for performing cylinder identification, a first storage means in the form of a shift register 12 storing, as a first series, the result of cylinder identification performed by the cylinder identification register 11, a first determination means in the form of a normal series determination means 13 for determining whether the first series is normal (i.e., coincident with a predetermined normal or correct series), a second storage means in the form of a second register 14 for storing as a second series the first series which has been determined to be normal, and a second determination means in the form of a verifying means 15 for making a comparison between the stored contents of the first and second shift registers 12, 14 to verify whether the second series is normal (i.e., coincident with the predetermined normal series) and for rewriting the second series into a normal or correct one if the second series is determined to be abnormal (i.e., not coincident with the normal series). The verifying means 15 includes a rewrite counter which provides a determination reference for verifying the second series.

The operation of the above-described conventional cylinder identification apparatus of FIG. 10 will be described while referring to FIGS. 7 through 9.

As described above, during engine operation, the signal generator 8 generates, in synchronism with the rotation of the engine, a reference position signal L which is input to the microcomputer 10 via the interface 9. Based on the reference position signal L as shown in FIG. 9, the cylinder identification register 11 of the microcomputer 10 calculates the duty cycle of each cylinder (i.e., the ratio of the width t1, t2, t3 or t4 of each pulse in the reference position signal L to the period T between the successive pulses), and compares the duty cycles of the respective cylinders with each other to determine which one of the duty cycles is different from the others. In this case, it is determined that the pulse having a higher duty cycle than that of the other pulses corresponds to the specific cylinder #2. If the specific cylinder #2 is identified in this manner, the cylinder identification register 11 stores a digit "1", whereas if one of the other cylinders #1, #3 or #4 is identified, a digit "0" is stored in the first shift register 12. For example, the first shift register 12 has a capacity of eight bits, and sequentially stores an input signal from the cylinder identification register 11 to update the first series while successively shifting the content or 8-bit serial number in the register 12 bit by bit.

The normal series determining or verifying means 13 determines whether the first series stored in the first shift register 12 has a normal or correct bit pattern. Specifically, if the first series is coincident with one of the following bit patterns (1) through (4), it is determined to be normal or correct, and thus stored or registered in the second shift register 14. 00010001 . . . (1) 00100010 . . . (2) 01000100 . . . (3) 10001000 . . . (4)

Once the second series, which has been determined to be normal or correct, is registered in the second shift register 14, the second shift register 14 thereafter successively turns or shifts the above-mentioned second series in the following order as the engine cycle or stroke proceeds:

(1) →(2) →(3) →(4) →(1) →. . .

Accordingly, if the result of cylinder identification performed by the cylinder identification register 11 upon each engine cycle is always normal or correct, then the first series registered in the first shift register 12 and the second series registered in the second shift register 14 will coincide with each other.

Therefore, the verifying means 15 compares the first series registered in the first shift register 12 with the second series registered in the second shift register 14, and determines the second series to be normal or correct if there is agreement between the first and second series, but determines it to be abnormal or incorrect if there is disagreement therebetween. If it is determined that the second series is incorrect, the verifying means 15 rewrites or updates the second series into a correct one.

FIG. 11 is a flow chart showing the above-described cylinder identification process or routine carried out by the microcomputer 10. This interrupt routine is carried out in synchronization with the rising of each pulse of the reference position signal L for each engine cycle, i.e., at the first reference position B75".

First, in Step S0, the second series in the second shift register 14 is advanced as described above to meet the processing of engine cycles, and then in Step S1, a cylinder identification routine is carried out which will be described in detail later. In Step S2, the result of cylinder identification performed at each engine cycle is stored in the cylinder identification register 11 as a digit "1" or "0" according to the specific cylinder or the other cylinders.

Subsequently, in Step S2, the results of cylinder identification successively obtained in Step S1 are sequentially shifted bit by bit for each cylinder cycle and stored in the first shift register 12 as an eight bit signal.

In Step S3, it is checked whether the first series has already been determined to be normal. If not, then in Step S4, the verifying means 13 determines whether the first series coincides with one of the above-mentioned normal or correct series (1) through (4). If in Step S4 it is determined that the first series is normal or correct, then the program goes to Step S5 where the first series is stored in the second shift register 14 as a second series. If, however, the first series is determined to be abnormal or incorrect in Step S4, the program jumps into Step S11 while skipping Step S5.

On the other hand, in the event that it is confirmed in Step S3 the first series has already been determined as normal or correct, then in Step S6 the verifying means 15 compares the first series stored in the first shift register 12 with the second series stored in the second shift register 14 for verification of the second series.

If there is disagreement between the first and second series thus compared, then in Step S7 it is further determined whether the first series compared is normal. If so, the second series is determined to be abnormal and the second series rewrite counter is incremented in Step S8.

If, however, it is determined in Step S6 that the second series is normal, or if in step S7 it is determined that the first series is abnormal, then in Step S9 the second series rewrite counter is reset and in Step S11 the second series is reflected on engine control. Namely, using the second series as cylinder identification information, an unillustrated engine control unit performs calculations for engine control such as ignition timing, fuel injection timing, etc., and then waits for the following input at the rising of the following pulse of the reference position signal L. Thereafter, the program returns to the first Step S10 from Step S11.

Also, after incrementation of the rewrite counter in Step S8, it is determined in Step S10 whether the count of the rewrite counter is equal to or greater than a predetermined value n. If the answer is negative, the program goes to Step S11, whereas if the answer is positive, the program goes to Step S5.

Accordingly, if the count of the rewrite counter reaches the predetermined value n after repeated incrementations of the counter in Step S8, it is determined what the second series is abnormal, and the first series is stored in the second shift register 14 as a second series. Thus, the abnormal or incorrect second series is rewritten into a normal or correct series.

FIG. 12 is a flow chart showing the cylinder identification process performed in Step S12. As illustrated in FIG. 12, first in Step S20, a high-level duration t (t0, t1) of the reference position signal L and a total period T (a high-level duration plus a low-level duration) between the rising edges of successive pulses of the reference position signal L are calculated. Then, in Step S21, a pulse duty ratio of the high-level duration t to the total period T for each engine cycle is calculated.

Subsequently, in Step S22, the ratio t/T is averaged with a weight factor k (0<k<1) to provide a threshold $a_n$, as follows:

$$a_N = (1-k)a_{N-1} + k(t/T)_N$$

where N is an ordinal number corresponding to the times of calculations.

In Step 823, the pulse duty ratio t/T for each cylinder as obtained in Step S21 is compared with the threshold $a_n$. If a deviation or difference $(t/T - a_N)$ between the pulse duty ratio t/T and the threshold $a_N$ is greater than zero, it is identified in Step S24 that the pulse corresponds to the specific cylinder #2, and the cylinder identification register 11 is set to "1". If $t/T - a_N \leq 0$, however, it is identified in Step S25 that the pulse corresponds to one of the other cylinders #1, #3 and #4, and the cylinder identification register 11 is set to "0". After the cylinder identification Step S24 or S25, a return is performed to Step S2.

With the above-described conventional cylinder identification apparatus as constructed above, cylinder identification is carried out on the basis of the pulse duty ratio t/T of the reference position signal L without taking account of an occurrence of misfiring. Thus, in the event that there takes place a variation in the rotational speed of the engine due to misfiring, the determination for the pulse duty cycle of the reference position signal L in Step S23 can be in error. As a result of such misidentification, the second series is erroneously reflected on engine control as cylinder identification information so that resultant miscalculations of engine operating parameters such as ignition timing, fuel injection timing, etc., can cause improper engine operation or damage to the engine.

SUMMARY OF THE INVENTION

The present invention is intended to obviate the above-described problems encountered with the conventional cylinder identification apparatus, An object of the present invention is to provide an improved cylinder identification apparatus for a multi-cylinder internal combustion engine which can prevent misidentification of cylinders from being reflected on engine control when misfiring takes place, thus avoiding resultant improper engine operation or damage to the engine.

Another object of the present invention is to provide an improved cylinder identification apparatus for a multi-cylinder internal combustion engine which can identify misfiring cylinder in a highly reliable manner.

In order to achieve the above objects, according to the present invention, there is provided a cylinder identification apparatus for a multi-cylinder internal combustion engine comprising: a signal generator for generating a reference position signal in synchronization with the rotation of the engine, the reference position signal comprising a series of a specific pulse corresponding to a specific cylinder and remaining pulses corresponding to the remaining cylinders, each pulse having a rising edge and a falling edge respectively corresponding to a first reference position and a second reference position of a piston in a corresponding cylinder, the rising edge of each specific pulse being angularly coincident with that of each remaining pulse, the falling edge of each specific pulse being angularly offset from that of each-remaining pulse; cylinder identification means connected to receive the reference position signal from the signal generator for identifying the cylinders based on the reference position signal and generating a cylinder identification signal; misfire sensing means for sensing misfiring in the engine for each engine cycle and generating a misfire determination signal; and cylinder identification evaluating means connected to receive the cylinder identification signal and the misfire determination signal for preventing the result of a cylinder identification, which has been performed by the cylinder identification means during an engine cycle in which misfiring is sensed by the misfiring sensing means, from being reflected on engine control.

Preferably, the cylinder identification evaluating means comprises: first storage means connected to receive the cylinder identification signal for successively fetching the cylinder identification results for a predetermined number of engine cycles and storing them as a first series; first determination means for determining whether the first series is coincident with a predetermined normal series; and second storage means for storing the first series as a second series if the first series is coincident with the normal series. Cylinder identification information obtained from the second series is utilized for engine control.

The cylinder identification evaluating means may further comprise second determination means for making a comparison between the first and second series when the first series contains no misfiring cycle in which there is no misfiring in the cylinders, the second determination means being operable to rewrite the second series into a correct one when the second series is not coincident with the normal series.

The cylinder identification evaluating means may further comprise misfiring cylinder identifying means for identifying a misfiring cylinder based on the second series when misfiring is sensed by the misfiring sensing means. Preferably, the misfire sensing means senses misfiring based on a period between the first reference positions of the successive pulses of the reference position signal.

The above and other objects, features and advantages of the present invention will become more readily apparent from the ensuing detailed description of a few preferred embodiments of the invention taken in conjunction with the accompanying drawings.

DESCRIPTION OF THE PREFERRED EMBODIMENTS

Preferred embodiments of the present invention will now be described in detail while referring to the accompanying drawings.

Embodiment 1

Figure 1:
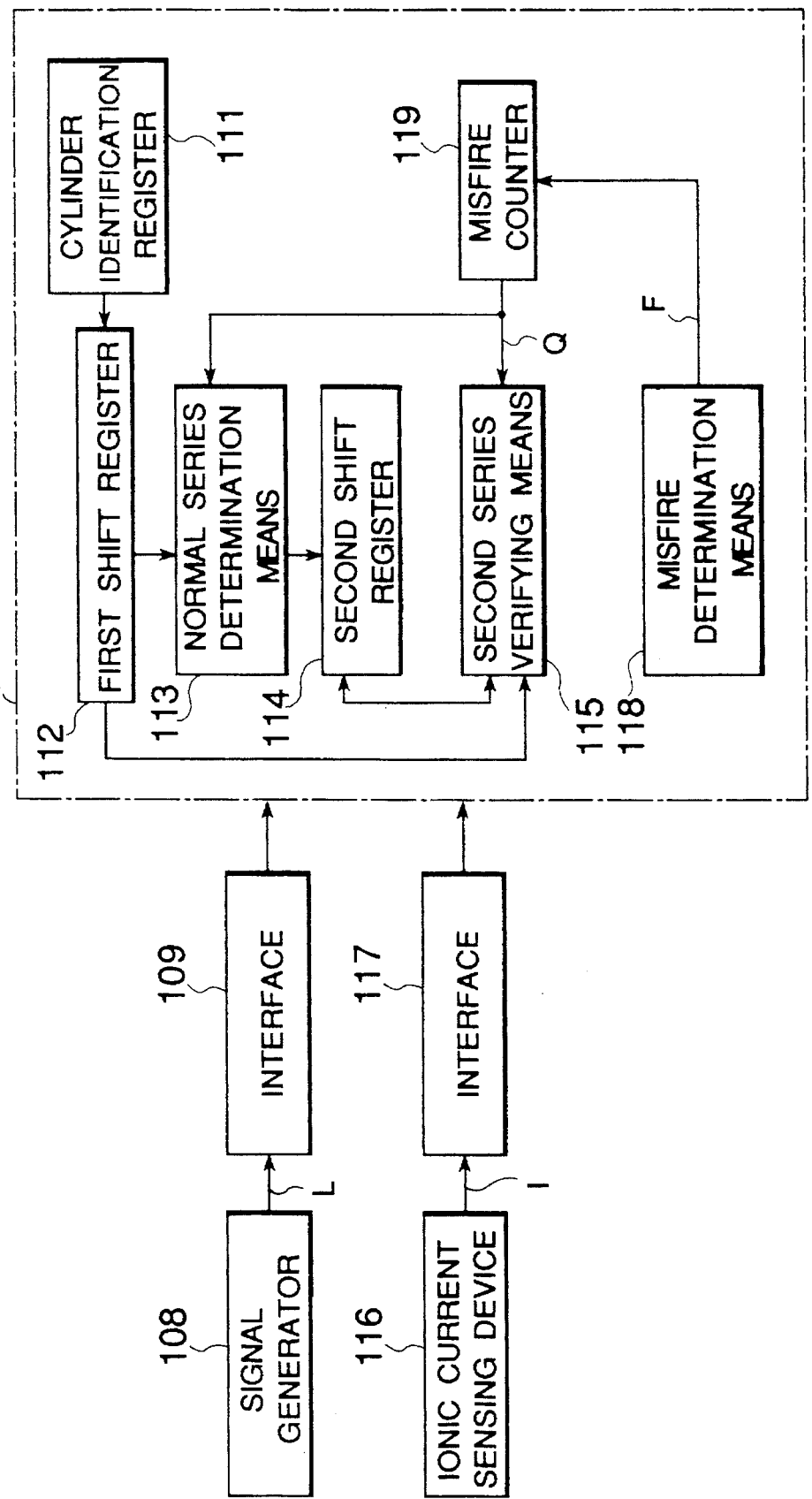
FIG. 1 is a block diagram of a cylinder identification apparatus for a multi-cylinder internal combustion engine in accordance with a first embodiment of the present invention.

FIG. 1 shows in block form the general arrangement of a cylinder identification apparatus for a multi-cylinder internal combustion engine in accordance with a first embodiment of the invention. In this figure, the apparatus illustrated includes a signal generator 108, and an interface 109 and a control unit in the form of a microcomputer 110. Among these components, the signal generator 108 and the interface 109 are similar in construction and operation to the elements 8 and 9 of FIG. 10. The microcomputer 110 includes a cylinder identification register 111, a first shift register 112, a normal series determination means 113, a second shift register 114, a verifying means 115, a misfire determination means 118, and a misfire counter 119, all of which will be described later in detail. Among these components, the elements 111, 112 and 114 are similar to the elements 11, 12 and 14 of FIG. 10, and the elements 113 and 115 correspond to but differ in operation from the elements 13 and 15, respectively. In addition to the above components 108, 109 and 110, the cylinder identification apparatus of this embodiment further includes the following components.

An ionic current sensing device 116 senses an ionic current which is generated through ionization of an air/fuel mixture in each cylinder upon combustion thereof by application of a bias voltage, and generates a corresponding ionic current signal I which is input to the microcomputer 110 through an interface 117.

Figure 9:
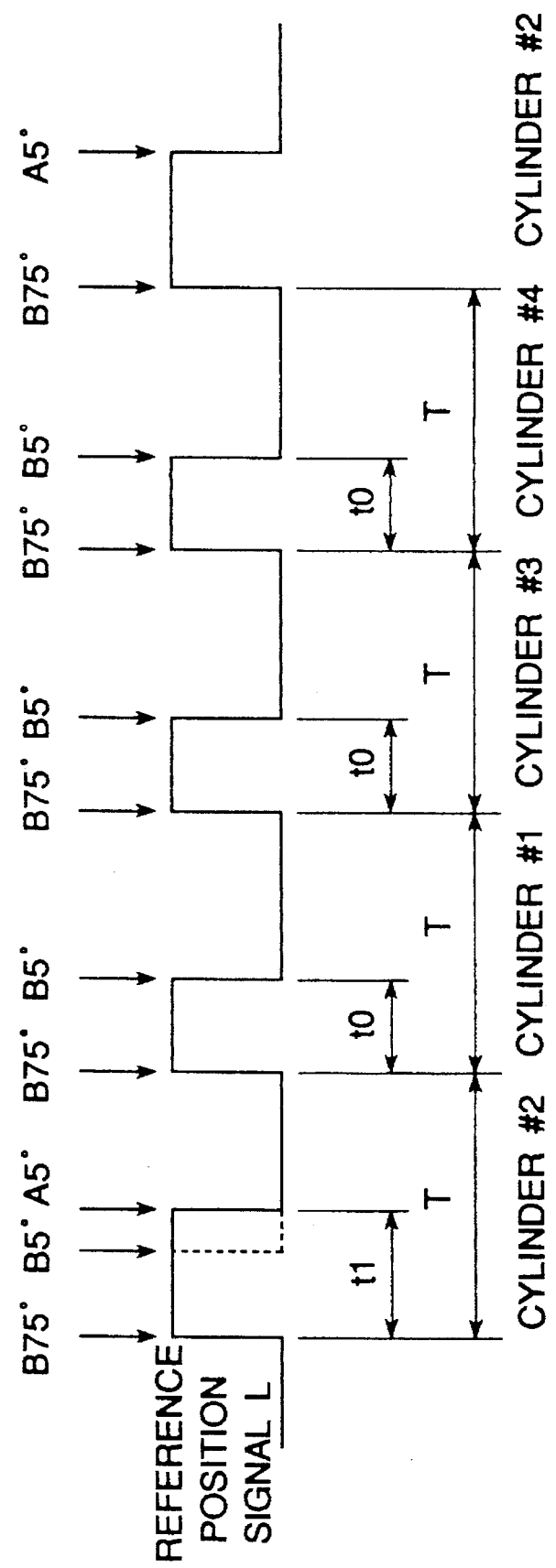
FIG. 9 is a waveform diagram of a common single-kind reference position signal.

The microcomputer 110 includes, in addition to the above-mentioned mentioned components 111 through 115, a misfire determination means 118 and a misfire counter 119. The misfire determination means 118 serves to determine, based on the reference position signal L from the signal generator 108 and the ionic current signal I from the ionic current sensing device 116, whether there is misfiring in the cylinders. Specifically, the misfire determination means 118 determines occurrence of misfiring when it does not sense an ionic current signal I during a time span T from the rising edge of a pulse in the reference position signal L to that of the following pulse (see FIG. 9). Upon determination of misfiring, the misfire determination means 118 generates a misfire determination signal F which is input to the misfire counter 119. The misfire counter 119 is incremented upon rising of each pulse in the reference position signal L, reset by a misfire determination signal 118 from the misfire determination means 119 and outputs its count Q to the normal series determination means 113 and the verifying means 115. The count Q of the counter 119 is clipped to a predetermined maximum value.

As is clear from the foregoing description, the misfire determination means 118 and the misfire counter 119 are incorporated in the microcomputer 110. The misfire determination means 118 is constructed to cooperate with the first register 112, the normal series determination means 113, the second shift register 114, and the verifying means 115 to constitute a misfire sensing means of the invention. The misfire counter 119 is constructed to cooperate with the first shift register 112, the normal series determination means 113, the second shift register 114 and the verifying means 115 to constitute a cylinder identification evaluating means of the invention which acts to prevent misidentification of cylinders by the cylinder identification register 111 from being reflected on engine control when there is misfiring in the cylinders.

The normal series determination means 113 determines that the first series stored in the first shift register 112 contain no misfiring cycle when the count Q of the misfire counter 119 is equal to or greater then 8, and in this case, it further determines whether the bit pattern (i.e., the sequence of 8 bits) of the first series is normal or correct.

The verifying means 115 compares the first series in the first shift register 112 with a second series in the second shift register 114 only when the count Q of the misfire counter 119 is equal to or greater than 8 and when the first series contains no misfiring cycle, and it rewrites the second series into a normal or correct series if there is disagreement therebetween.

Figure 2:
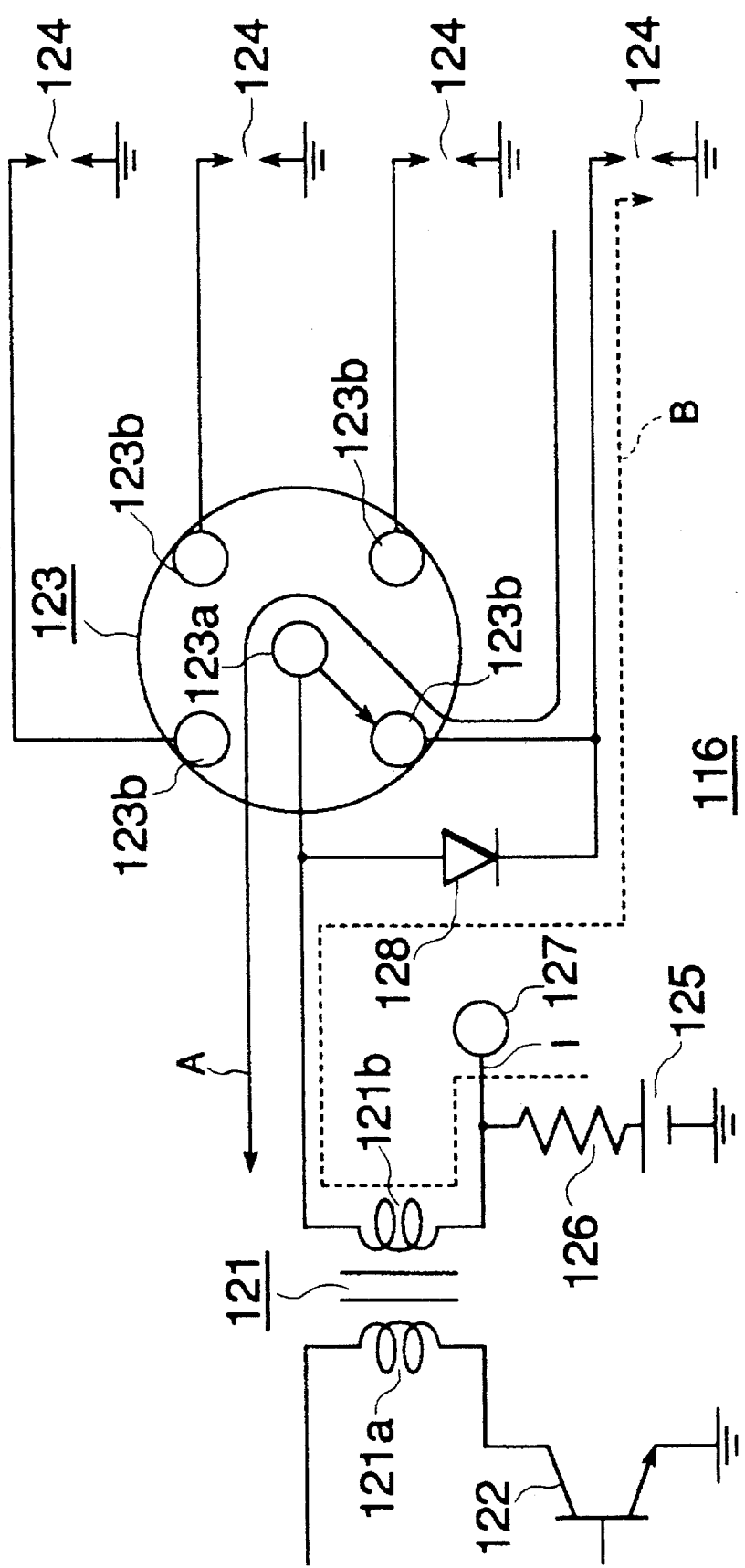
FIG. 2 is a circuit diagram of a concrete circuit arrangement of an ionic current sensing device shown in FIG. 1.

FIG. 2 shows an example of a concrete circuit arrangement of the ionic current sensing device 116 which is illustrated in FIG. 1. In FIG. 2, an ignition coil 121 includes a primary winding 121a and a secondary winding 121b. The primary winding 121a is connected at one end thereof to a power supply and at the other end to a collector of a power transistor 122 which has an emitter connected to ground and a base connected to an unillustrated engine control unit for receiving a control signal such as an ignition signal therefrom. When an ignition signal is applied to the base of the power transistor 122, the power transistor 122 is turned on to permit a primary current to flow from the unillustrated power supply to ground through the now conductive power transistor 122, thereby generating a high voltage across the secondary winding 121b. The secondary winding 121b is connected at one end thereof to a central electrode 123a of a distributor 123, The distributor 123 has a plurality (four in the illustrated example) of peripheral electrodes 123b disposed around the central electrode 123a at equal circumferential intervals so that a pointer of the central electrode 123a successively faces the peripheral electrodes with a limited gap formed therebetween during rotation of the central electrode 123a. The peripheral electrodes 123b are connected to corresponding spark plugs 124. The secondary winding 121b is also connected at the other end thereof to a positive electrode of a DC power supply 125 through a resistor 126 so that: a biasing voltage is sequentially supplied to the spark plugs 124 through the distributor 123. When the power transistor 122 is turned off, there develops a high voltage across the secondary winding 121b of the ignition coil 121 which causes an ignition current, A to flow from the spark plugs 124 to the secondary winding 121b through the distributor 123. Upon combustion of an air/fuel mixture in each cylinder, an ionic current I flows from the DC power supply 125 to the spark plug 124 of the corresponding cylinder through the resistor 126, the secondary winding 121b, and a reverse current checking diode 128 which is connected between the central electrode 123a and each of the peripheral electrodes 123b of the distributor 123 (though only one of the diodes 128 is illustrated), The ionic current B is sensed end converted by the resistor 126 into a corresponding voltage there cross which is output as an ionic current signal I from an output terminal 127.

The operation of the ionic current sensing device 116 of FIG. 2 will be described below in detail. When the power transistor 122 is turned off by an ignition signal supplied to the base thereof from the unillustrated engine control unit, a primary current supplied from the unillustrated power supply to the primary winding 121a is cut off, thus generating a high ignition voltage of about −10 kV to −25 kV across the secondary winding 121b. As a result, an ignition current A flows from the spark plugs 124 to the secondary winding 121b to thereby cause a discharge between the electrodes of a spark plug 124, which is connected to the secondary winding 121b via the distributor 123, thus firing an air/fuel mixture in the corresponding cylinder.

During combustion of the mixture, there develop a great number of ions in the combusting cylinder under the action of ionization, so the electrodes of each spark plug 124 functions as ionic current sensing electrodes after discharge. Thus, under the action of a positive bias voltage of about 300 V of the DC power supply 125, an ionic current B flows from the power supply 125 to the spark plugs 124 via the resistor 126, the secondary winding 121b and the diode 128. As a result, a voltage corresponding to the magnitude of the ionic current B develops across the resistor 128, which is sensed or output as an ionic current signal I at the output terminal 127. The ionic current signal I thus generated is supplied to the microcomputer 110 where it is utilized to sense the combustion of each cylinder.

Figure 3:
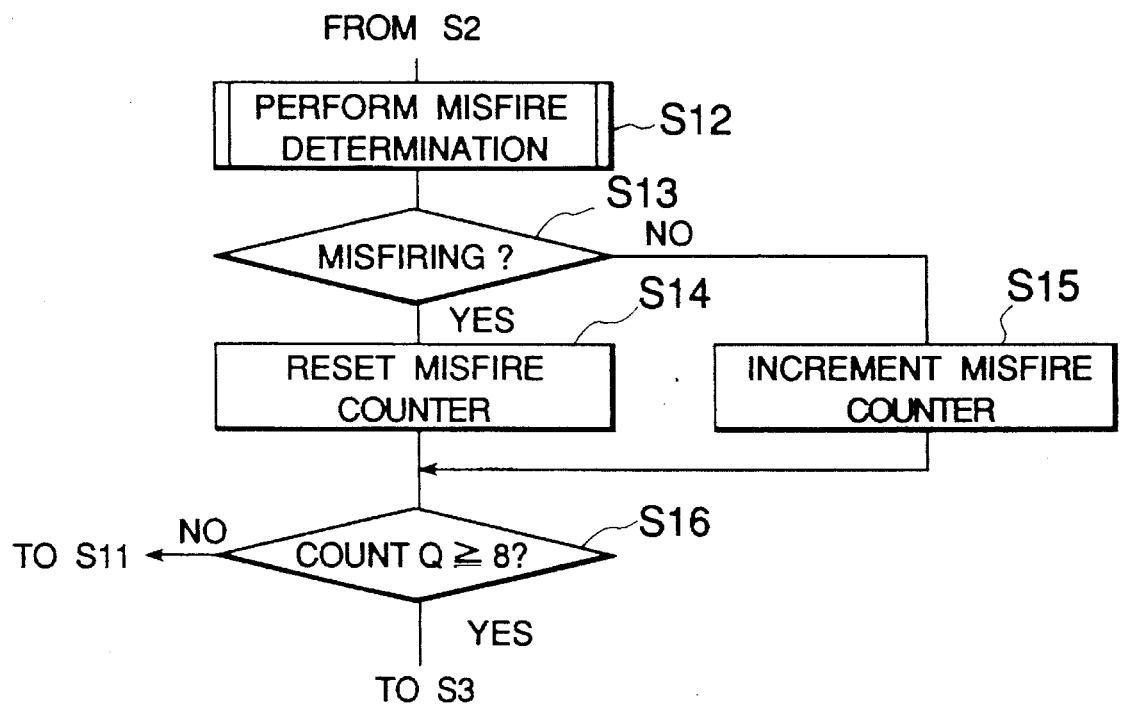
FIG. 3 is a flow chart showing the operation or processing of the apparatus of FIG. 1.
Figure 11:
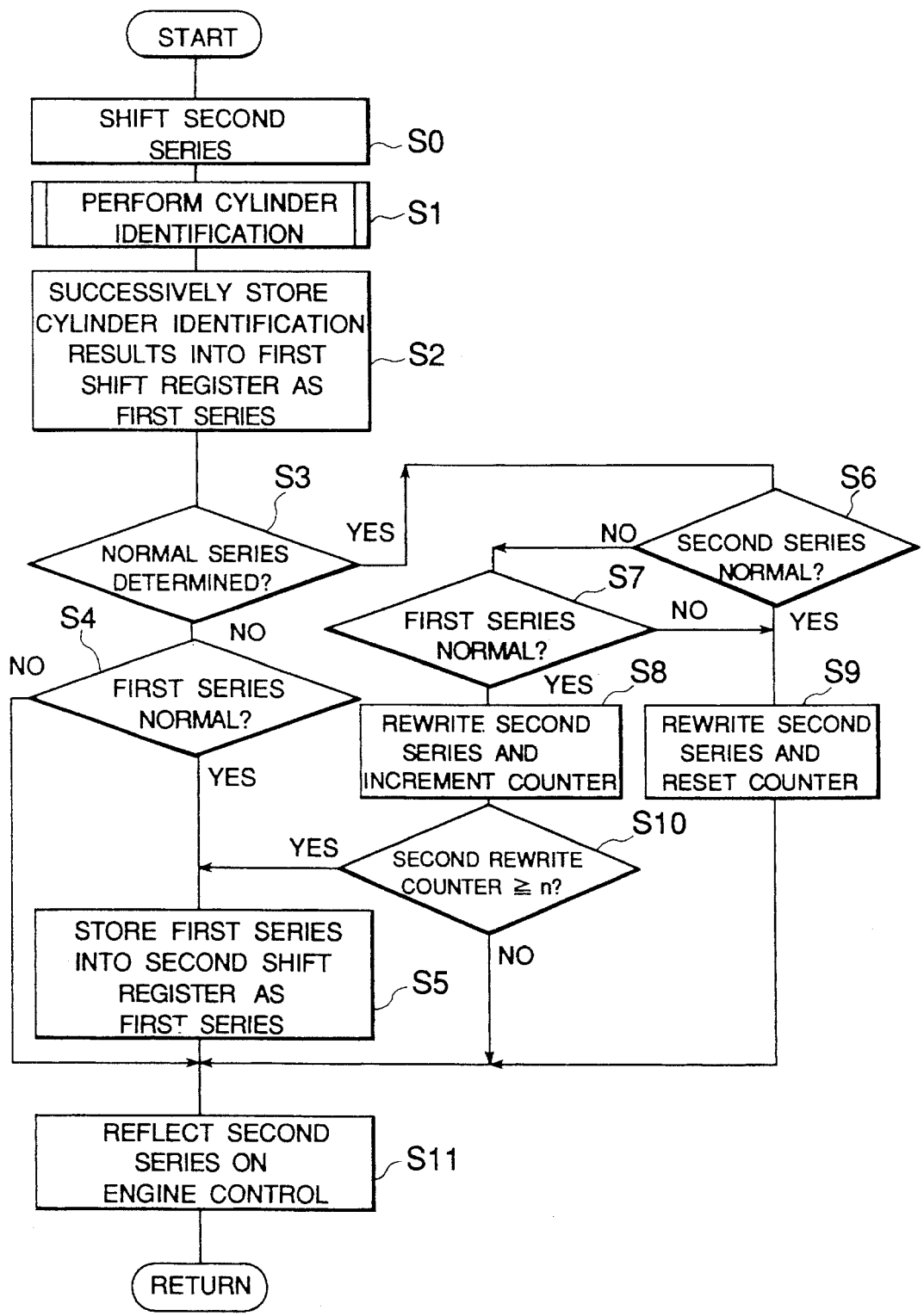
FIG. 11 is a flow chart showing the operation or processing of the conventional cylinder identification apparatus.
Figure 12:
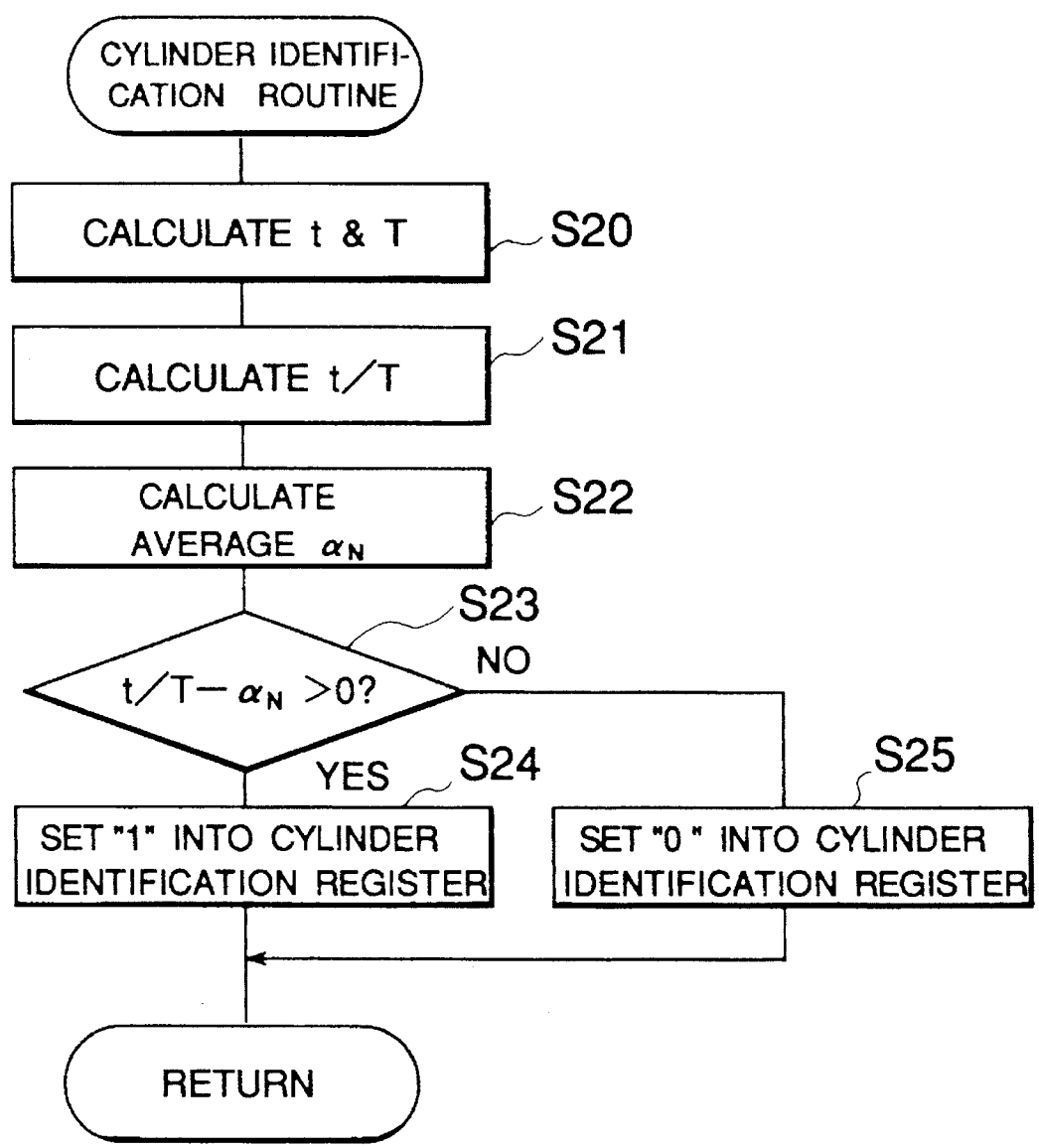
FIG. 12 is a flow chart showing a cylinder identification routine of FIG. 11.

FIG. 3 shows an essential portion of a cylinder identification operation or processing carried out by the microcomputer 110. As referred to above in connection with the flow chart of FIG. 11, this processing is performed in synchronization with rising (i.e., at an crank angle of B75°) of the reference position signal L of FIG. 9. The processing of this invention is substantially similar to the processing of the conventional cylinder identification apparatus as illustrated in FIG. 11 except for Steps S12 through S16 of FIG. 3. Steps S0 through S11 similar to those of FIG. 11 are omitted from FIG. 3.

The operation of the apparatus of FIG. 1 will be described while referring to the flow chart of FIG. 3.

Figure 10:
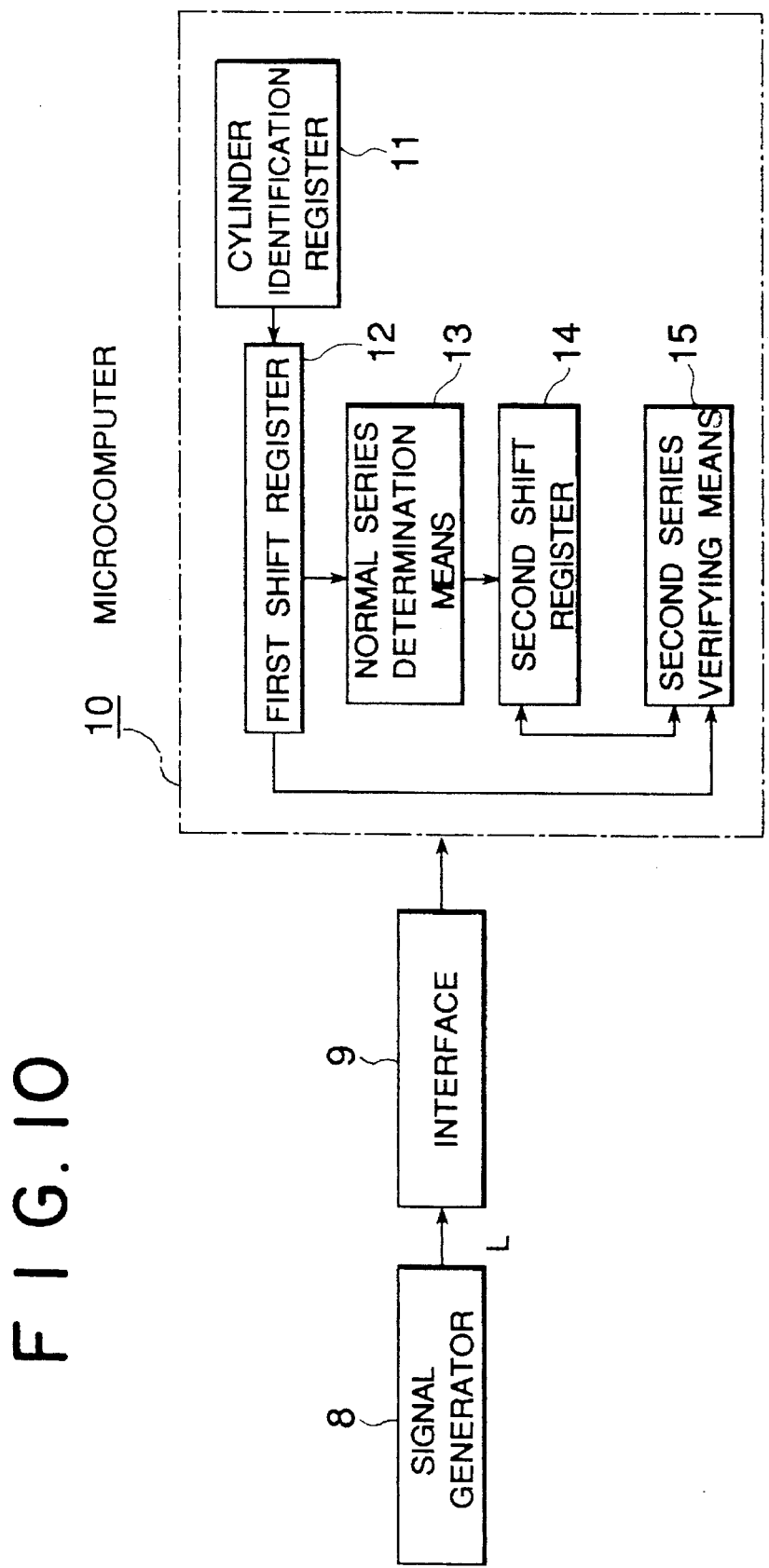
FIG. 10 is a block diagram of a conventional cylinder identification apparatus for a multi-cylinder internal combustion engine.

First, Steps S0 through S2 of FIG. 11 are carried out as in the conventional apparatus of FIG. 10. After the first series is stored in the first shift register 112 in Step S2 the misfire determination means 118 performs a misfire determination based on the reference position signal L and the ionic current signal I in Step S12, Namely, it is determined whether an ionic current signal I has been sensed after the last rising of the reference position signal L, and if not, an occurrence of misfiring is determined.

Subsequently in Step S13, the result of the determination in Step S12 is checked. If it is confirmed in Step S13 that a misfire determination has been made, the misfire determination means 118 generates a misfire determination signal F to the misfire counter 119 which is thereby reset in Step S14. If, however, a determination of no misfiring is confirmed in Step S13, the misfire counter 119 is incremented by 1 in Step S15. After Step S14 or 15, the program proceeds to Step S16.

In Step S16, it is determined whether the count Q of the misfire counter 119 is equal to or greater than 8. If Q≧8, it is determined that the first series stored in the first shift register 112 contains no misfiring cycle, whereas if Q<8, it is determined that the first series contains a misfiring cycle.

If in Step S16 it is determined, based on the condition (Q>8), that the first series contains no misfiring cycle, the program goes to step S3 of FIG. 11. Thereafter, Steps S3 through S11 of FIG. 11 are carried out by the microcomputer 110, as in the conventional apparatus of FIG. 10.

If, however, it is determined in Step S16 that the first series contains a misfiring cycle (i.e., Q<8), the program returns directly to the normal series determining Step S3 of FIG. 11, whereby erroneous rewriting of the second series based on the misidentification of cylinders is positively prevented.

Embodiment 2

Although in the above-mentioned first embodiment, determination as to whether misfiring takes place in the cylinders is made on the basis of the ionic current signal I from the ionic current sensing device 118, such determination can be based on the reference position signal L instead of using the ionic current signal I.

Figure 4:
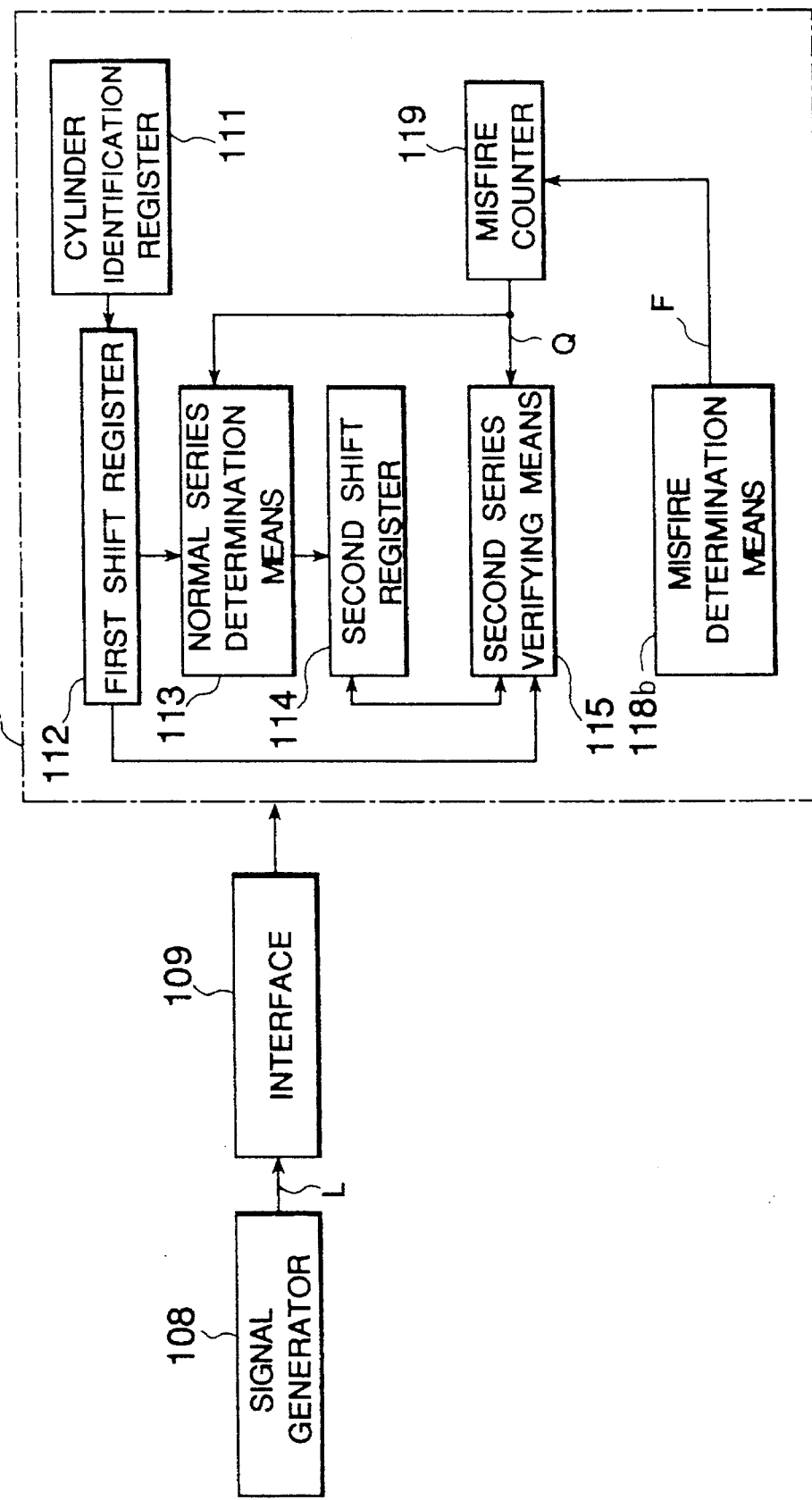
FIG. 4 is a block diagram of a cylinder identification apparatus for s multi-cylinder internal combustion engine having a misfire sensing function in accordance with a second embodiment of the invention.

FIG. 4 shows in block form the general arrangement, of a cylinder identification apparatus according to a second embodiment of the invention in which the determination of misfiring is based on the reference position signal L. This embodiment, is substantially similar to the first embodiment of FIG. 1 except for the fact that the ionic current sensing device 118 and the interface 117 are omitted, and that the operation of a misfire determination means 118b of a microcomputer 110B is different from that of the misfire determination means 118 of FIG. 1.

Specifically, the misfire determination means 118b performs determination of misfiring based on the reference position signal L from the signal generator 108, The misfire determination means 118a calculates a deviation or difference $\Delta T(m)$ in successive periods T between the rising edges of successive pulses in the reference position signal L as follows.

$$\Delta T(m) = \{T(m) - T(m-1)\}/T_0 \qquad (1)$$

where $T(m)$ is the latest pulse-rising period between the rising edges of the latest two pulses of the reference position signal L; $T(m-1)$ is the pulse-rising period preceding one cycle from the latest pulse-rising period; and To is an average of the latest four pulse-rising periods $T(j)$ (j=m−3, m−2, m−1, and m). Specifically, To is expressed as follows:

$$T_0 = \Sigma T(j)/4$$

where $T(m-2)$ is the pulse-rising period preceding two cycles from the latest pulse-rising period $T(m)$; and $T(m-3)$ is the pulse-rising period preceding three cycles from the latest pulse-rising period $(T_m)$.

In this embodiment, if the deviation $\Delta T(m)$ is greater than a predetermined value, the misfire determination means 118b determines that there is misfiring in the cylinders, and generates a misfire determination signal F to the misfire counter 119 which is thereby reset.

Embodiment 3

Although the above-mentioned second embodiment only serves to prevent the result of cylinder identification from being reflected on engine control upon occurrence of a misfiring cycle, the function of identifying a misfiring cylinder can be added.

Figure 5:
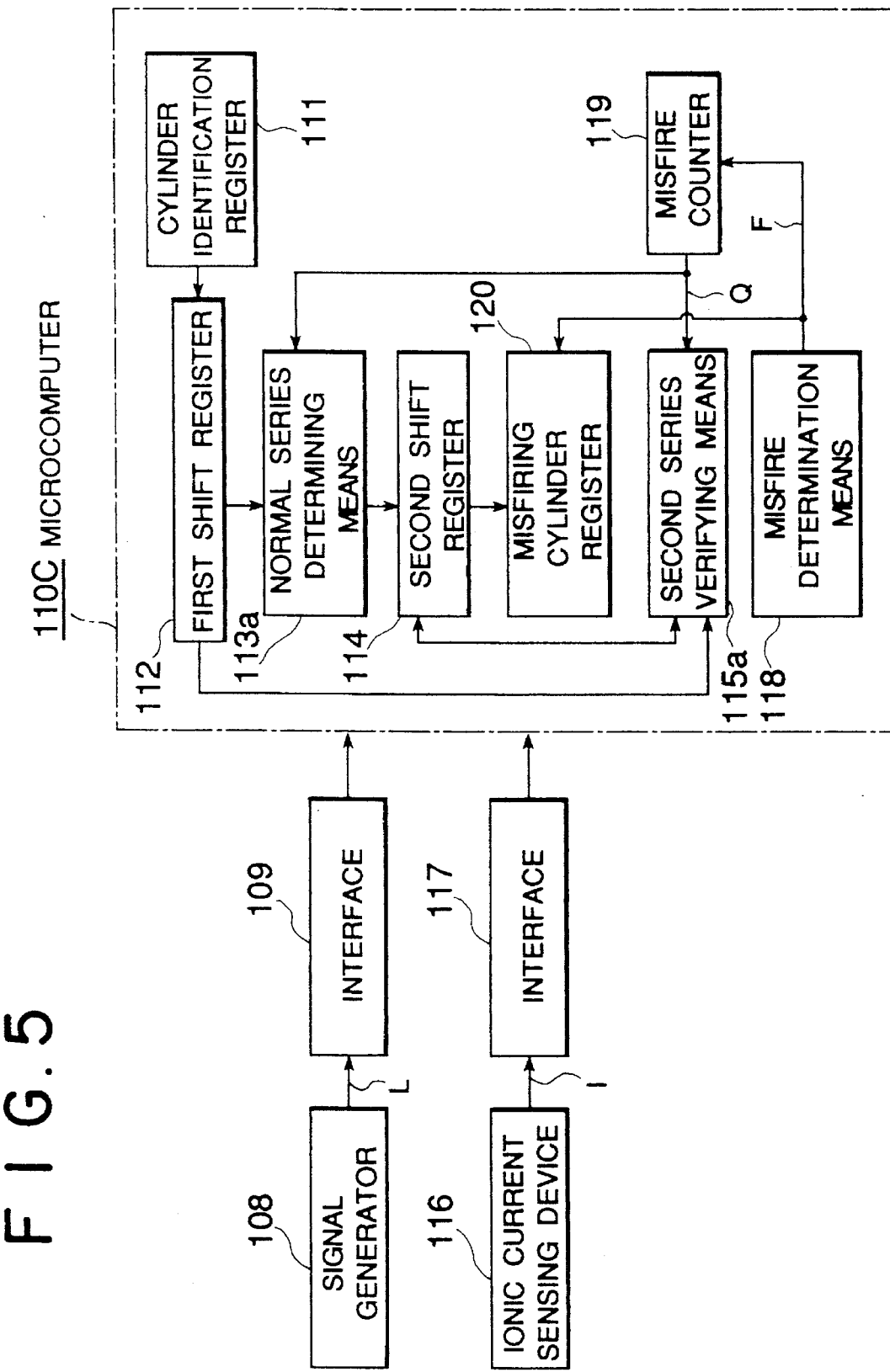
FIG. 5 is a block diagram showing a third embodiment of the invention having a misfiring cylinder identification function.

FIG. 5 shows in block form a third embodiment of the invention which has such a misfiring-cylinder identifying function. This embodiment is substantially similar in construction and operation to the first embodiment of FIG. 1 except for the fact that a microcomputer 110C includes a misfiring cylinder register 120.

Specifically, the misfiring cylinder register 120 identifies a misfiring cylinder based on the second series stored in the second shift register 114 when a misfire determination signal F is generated by the misfire determination means 118, and the register 120 stores or registers the misfiring cylinder.

The contents stored in the misfiring cylinder register 120 can be optionally read out from the outside through an appropriate reading means (not shown) such as a diagnosis tester, and also utilized to control various aspects of engine control such as cutting the fuel supply to the misfiring cylinder, as necessary.

Figure 6:
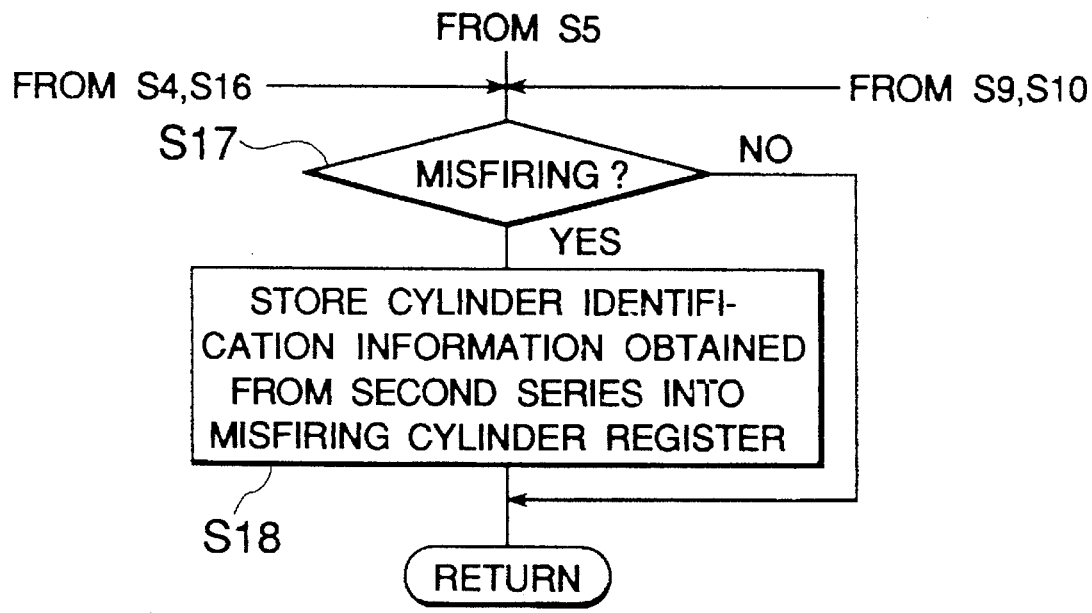
FIG. 6 is a flow chart showing the operation or processing of the third embodiment of FIG. 5.
Figure 7:
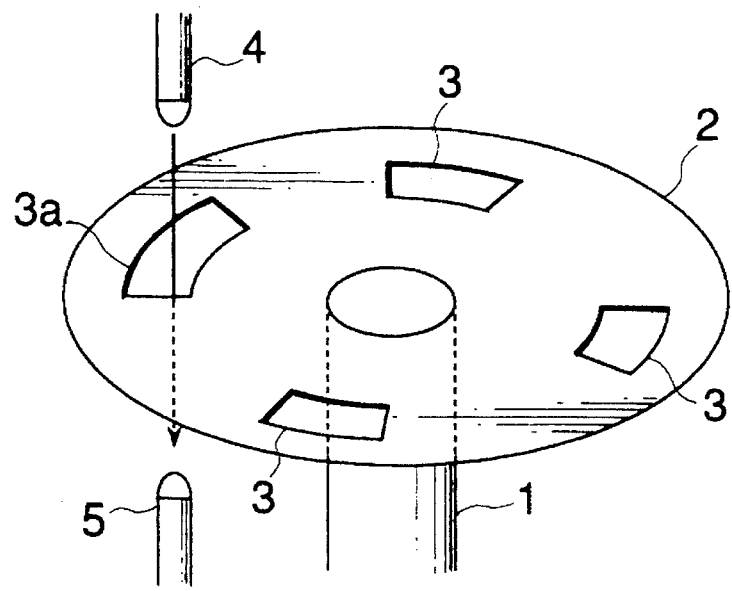
FIG. 7 is a perspective view of a common signal generator.
Figure 8:
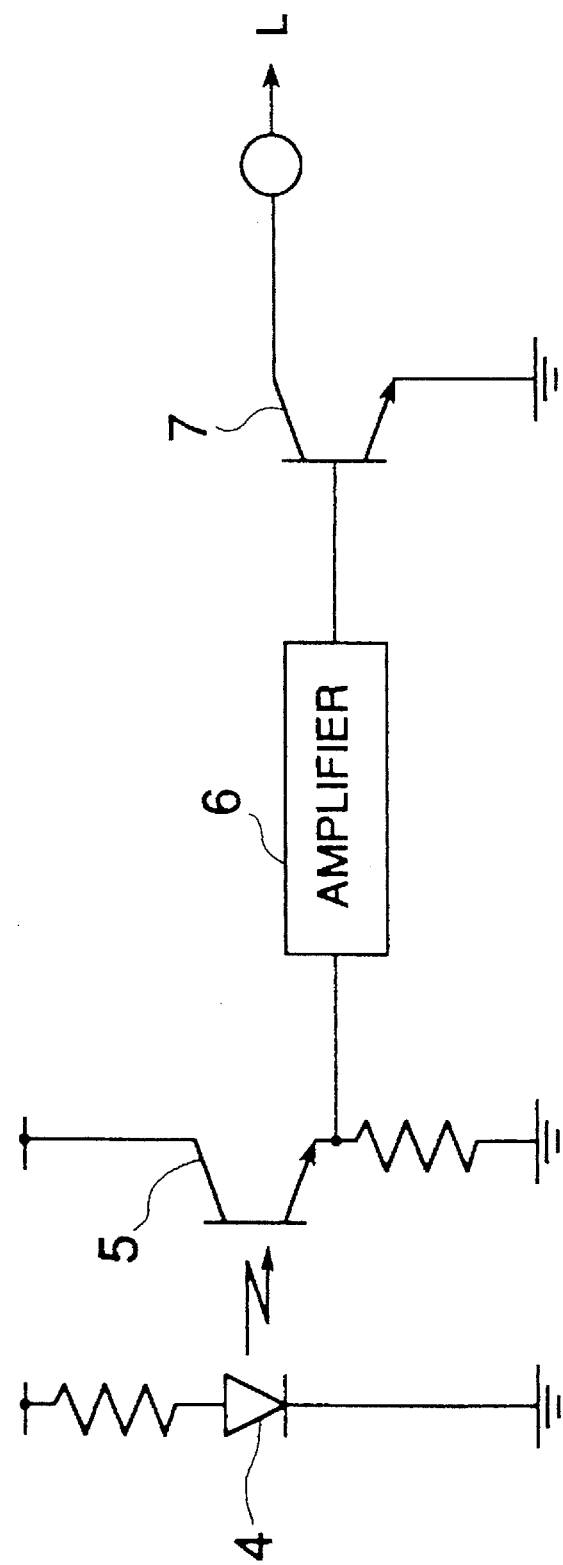
FIG. 8 is a circuit diagram of the common signal generator.

FIG. 6 shows an essential portion of the operation or processing carried out by the microcomputer 110C of this embodiment. The process of this embodiment is substantially similar to that of the first embodiment, except for new Steps S17 and 818 which replace the control reflecting Step S11 of FIG. 11.

In this embodiment, after the second series stored in the second shift register 114 has been normalized or corrected on the basis of the count Q of the misfire counter 119 in Steps S3 through S10, the misfiring cylinder register 120 determines, based on a misfire determination signal F from the misfire determination means 118, whether misfiring takes place in the present engine cycle, in Step S17. If so, then in Step S18, the misfiring cylinder register 120 identifies a misfiring cylinder based on the second series, and stores the information of the misfiring cylinder. If, however, the answer in Step S17 is negative, a return is performed while skipping Step S18.

What is claimed is:

1. A cylinder identification apparatus for a multi-cylinder internal combustion engine, comprising:

a signal generator for generating a reference position signal in synchronization with the rotation of the engine, said reference position signal comprising a serial plurality of pulses including a unique pulse corresponding to a single specific cylinder and a plurality of identical remaining pulses corresponding to the remaining cylinders, each pulse having a rising edge and a falling edge respectively corresponding to a first reference position and a second reference position of a piston in a corresponding cylinder, the rising edge of each unique pulse being angularly coincident with that of each remaining pulse, and the falling edge of each unique pulse being angularly offset from that of each remaining pulse;

cylinder identification means connected to receive said reference position signal from said signal generator for identifying said cylinders based on said reference position signal and generating a cylinder identification signal;

misfire sensing means for sensing misfiring in said engine for each engine cycle and generating a misfire determination signal; and cylinder identification evaluating means connected to receive said cylinder identification signal and said misfire determination signal and responsive thereto for preventing the result of an erroneous cylinder identification caused by misfiring from being utilized to implement engine control.

2. A cylinder identification apparatus according to claim 1, wherein said cylinder identification evaluating means comprises:

first storage means connected to receive said cylinder identification signal for successively fetching the cylinder identification results for a predetermined number of engine cycles and storing them as a first series;

first determination means for determining whether said first series is coincident with a predetermined normal series; and second storage means for storing said first series as a second series if said first series is coincident with the normal series;

wherein cylinder identification information obtained from said second series is utilized for engine control.

3. A cylinder identification apparatus according to claim 2, wherein said cylinder identification evaluating means further comprises second determination means for making a comparison between said first and second series when said first series contains no misfiring cycle in which there is no misfiring in said cylinders, said second determination means being operable to rewrite said second series into a correct one when said second series is not coincident with said normal series.

4. A cylinder identification apparatus according to claim 2, wherein said cylinder identification evaluating means further comprises misfiring cylinder identifying means for identifying a misfiring cylinder based: on said second series when misfiring is sensed by said misfiring sensing means.

5. A cylinder identification apparatus according to any one of claims 1 through 4, wherein said misfiring sensing means senses misfiring based on a period between the first reference positions of said successive pulses of said reference position signal.

* * * * *